US010153997B2

(12) United States Patent
Judd et al.

(10) Patent No.: US 10,153,997 B2
(45) Date of Patent: Dec. 11, 2018

(54) INCORPORATING SELECTABLE APPLICATION LINKS INTO CONVERSATIONS WITH PERSONAL ASSISTANT MODULES

(71) Applicant: Google Inc., Mountain View, CA (US)

(72) Inventors: Tilke Judd, Zürich (CH); Yariv Adan, Cham (CH); Zaheed Sabur, Adliswil (CH); Behshad Behzadi, Freienbach (CH); Lucas Mirelmann, Zürich (CH); Jan Lamecki, Zürich (CH); Dhruv Bakshi, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 133 days.

(21) Appl. No.: 15/207,821

(22) Filed: Jul. 12, 2016

(65) Prior Publication Data

US 2017/0339088 A1 Nov. 23, 2017

Related U.S. Application Data

(60) Provisional application No. 62/337,845, filed on May 17, 2016.

(51) Int. Cl.
*H04L 12/58* (2006.01)
*H04L 29/08* (2006.01)
*G06F 9/48* (2006.01)

(52) U.S. Cl.
CPC ............ *H04L 51/18* (2013.01); *G06F 9/4843* (2013.01); *H04L 51/046* (2013.01); *H04L 51/16* (2013.01); *H04L 67/02* (2013.01)

(58) Field of Classification Search
CPC ....... H04L 51/046; H04L 51/16; H04L 51/18; H04L 67/02; H04L 67/32

(Continued)

(56) References Cited

U.S. PATENT DOCUMENTS 9,253,137 B1 2/2016 Jackson et al.
2003/0101413 A1 5/2003 Klein et al.
(Continued)

FOREIGN PATENT DOCUMENTS

AU 2012201460 9/2013
WO 2011088053 7/2011

OTHER PUBLICATIONS

Armentano, Marcelo G., and Analía A. Amandi. "A framework for attaching personal assistants to existing applications." Computer Languages, Systems & Structures 35.4 (2009): 448-463.

(Continued)

*Primary Examiner* — Ruolei Zong
(74) *Attorney, Agent, or Firm* — Middleton Reutlinger

(57) ABSTRACT

Methods, apparatus, systems, and computer-readable media are provided for: operating an instance of a personal assistant module to serve a user while the user operates the client computing device, wherein the instance of the personal assistant module has access to a persistent record of a message exchange thread between the user and instance(s) of the personal assistant module; detecting cue(s) emanating from the persistent message exchange thread; identifying candidate application(s) that are installed on a client computing device operated by the user, wherein the candidate application(s) are associated with content of the message exchange thread; and incorporating, into a transcript of the message exchange thread that is displayed in a graphical user interface rendered on the client computing device, selectable link( operable by the user to cause the client computing device to expose to the user an interface associated with a respective candidate application.

22 Claims, 9 Drawing Sheets

(58) Field of Classification Search
 USPC .......................................................... 709/206
 See application file for complete search history.

(56) References Cited

U.S. PATENT DOCUMENTS

| | | | |
|---|---|---|---|
| 2006/0155785 A1 | 7/2006 | Berry et al. | |
| 2012/0016678 A1* | 1/2012 | Gruber | G06F 17/3087 704/275 |
| 2013/0152092 A1 | 6/2013 | Yadgar | |
| 2013/0326354 A1 | 12/2013 | Anderson | |
| 2014/0204173 A1 | 7/2014 | Eidelson et al. | |
| 2014/0297283 A1 | 10/2014 | Hebert et al. | |
| 2014/0365885 A1* | 12/2014 | Carson | G06F 3/167 715/708 |
| 2015/0199967 A1* | 7/2015 | Reddy | G10L 25/30 704/249 |
| 2017/0026318 A1* | 1/2017 | Daniel | H04L 51/046 |
| 2017/0295122 A1* | 10/2017 | Pfriem | H04L 51/04 |

OTHER PUBLICATIONS

International Search Report and Written Opinion of PCT Ser. No. PCT/US16/68918 dated Mar. 20, 2017.
The Intellectual Property Office of the United Kingdom; Combined Search and Examination Report under Sections 17 and 18(3) of Application No. GB1621667.3 dated Mar. 17, 2017.

\* cited by examiner

INCORPORATING SELECTABLE APPLICATION LINKS INTO CONVERSATIONS WITH PERSONAL ASSISTANT MODULES

BACKGROUND

Personal assistant modules are software processes installed on computing devices such as smart phones, tablets, vehicle navigation systems, and smart watches to provide user-friendly interfaces for users to issue natural language commands. Users often issue natural language commands using their voices, but personal assistant modules may respond to other modalities as well, such as various forms of textual and/or image input. Content exchanged between a user and a personal assistant module is typically limited to text (e.g., typed or generated from voice input) or other data such as pictures, and is not typically saved for later use. Consequently, a user seeking outside information pertinent to the conversation must switch to a different application such as a web browser to obtain the desired information. Switching applications, particularly using mobile devices that often only display a single application at a time, can be distracting and burdensome, and may disrupt the flow of the conversation.

SUMMARY

The present disclosure is generally directed to methods, apparatus, and computer-readable media (transitory and non-transitory) for incorporating "selectable application links"—graphical elements incorporated into a message exchange thread between a user and a personal assistant module to expose the user to an interface associated with another application—directly into a transcript of the message exchange thread that is rendered on a client computing device (or simply, "client device") operated by the user. In various implementations, the selectable application links that are incorporated into a transcript may be dictated by resources of the client device that renders the transcript. For instance, one or more "candidate applications" that are somehow relevant to the content of the message exchange thread—and that are also installed on the client computing device operated by the user interacting with the personal assistant module—may be identified. In some implementations, only selectable application links to installed applications may be presented. In other implementations, if no applicable applications are installed, a link to an application installer (e.g., at an app store or on a web page) or web page having corresponding functionality to a non-installed app may be included instead.

Incorporation of selectable application links into a transcript may be triggered by various cues. In some implementations, the cues may emanate from content incorporated into the message exchange thread by one or more client computing devices operated by the user. For example, a user may ask an instance of a personal assistant module operating on a smart watch, "what do I have scheduled tonight?" The personal assistant module may search the user's calendar and/or other data sources (which may be online or local to the client device) and respond that the user has no plans that evening. Later, the user may interact with a second instance of the personal assistant module operating on a different client device, such as a smart phone or tablet. The user may say something like "Let's get a reservation at XYZ Café." The user was not clear about when the reservation should be made, so the second instance of the personal assistant module may consult the persistent message exchange thread to infer—based on the user's previous question to the first instance of the personal assistant module operating on the smart watch and/or the response thereto—that the user meant this evening.

Applications installed on a client device may be identified in various ways. In some implementations, applications installed on the client device may be known remotely from the client device, e.g., by an application store server that has a record of applications installed on one or more client devices forming a coordinated "ecosystem" of client devices operated by a user. In such case, data indicative of one or more selectable application links associated with applications known to be installed on a client device may be downloaded to the client device so that the client device can incorporate a selectable application link to those applications into a message thread. In some implementations, multiple installed applications may be identified remotely (and data indicative thereof downloaded to the client), and then the client device may select a subset of the multiple applications based on various signals, such as frequency of use of the application (e.g., among one or more client computing devices of the user's ecosystem, or on a single client computing device). In some implementations, the client device itself may identify installed applications. For example, an application "category" (e.g., "maps," "reservations," "music," "film," "messaging," "videoconferencing," "telephone," etc.) may be identified based on content of a message exchange thread, and then a client device may identify within the category what, if any, matching applications it has installed.

In some implementations, a computer implemented method may be provided that includes the following operations: operating, by a client computing device operated by a user, an instance of a personal assistant module to serve the user while operating the client computing device, wherein the instance of the personal assistant module has access to a persistent record of a message exchange thread between the user and one or more instances of the personal assistant module; detecting, by the instance of the personal assistant module, one or more cues emanating from the persistent message exchange thread, wherein the one or more cues trigger incorporation, into the persistent message exchange thread, of one or more selectable links to one or more applications distinct from the instance of the personal assistant module; identifying, by the instance of the personal assistant module, one or more candidate applications that are installed on a client computing device operated by the user, wherein the one or more candidate applications are associated with content of the message exchange thread; and incorporating, by the instance of the personal assistant module, into a transcript of the message exchange thread that is displayed in a graphical user interface rendered on the client computing device, one or more selectable links, wherein each selectable link is operable by the user to cause the client computing device to expose to the user an interface associated with a respective candidate application.

This method and other implementations of technology disclosed herein may each optionally include one or more of the following features.

In various implementations, the client computing device may be one of a plurality of client computing devices operated by the user, and each of the plurality of client computing devices may be configured to operate a separate instance of the personal assistant module with access to the persistent message exchange thread. In various implementations, the one or more cues comprise multiple messages incorporated into the persistent message exchange thread by different client computing devices of the plurality of client computing devices.

In various implementations, the identifying may be performed one or more of the processors that is remote from the client computing device, and data indicative of the one or more selectable links is downloaded to the client computing device. In various implementations, the method may further include selecting, by the instance of personal assistant module, a subset of the downloaded one or more selectable links for display based on one or more information signals. In various implementations, the one or more information signals may include a frequency of use of the one or more candidate applications.

In various implementations, the identifying may be performed by one or more of the processors that is integral with the client computing device. In various implementations, the one or more cues may emanate from the content of the message exchange thread. In various implementations, the one or more cues may include a keyword or phrase associated with a particular application.

In various implementations, the identifying may include identifying, as a candidate application, a web browser installed on the client computing device in response to a determination that a given application associated with content of the message exchange thread is not installed on the client computing device. In various implementations, the incorporating may include incorporating, into the transcript, a selectable link to an interactive webpage, wherein the interactive webpage may include functionality that corresponds to functionality of the given application that is not installed on the client computing device.

In various implementations, the identifying may include identifying, as a candidate application, a web browser installed on the client computing device in response to a determination that a given application associated with content of the message exchange thread is not installed on the client computing device. In various implementations, the incorporating may include incorporating, into the transcript, a selectable link to a webpage associated with downloading an installer of the given application.

In various implementations, the graphical user interface may include an operable portion and a persistent portion. The transcript may be rendered in the persistent portion. The operable portion may include one or more graphical elements that are operable to incorporate content into the message exchange thread. In some such implementations, the method may further include selectively incorporating, based on one or more signals, at least one non-persistent selectable link into the operable portion of the graphical user interface, wherein the at least one non-persistent selectable link is operable by the user to cause the client computing device to expose to the user an interface associated with a particular candidate application. In some implementations, the one or more signals may include a history of interaction between the user and the particular candidate application.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
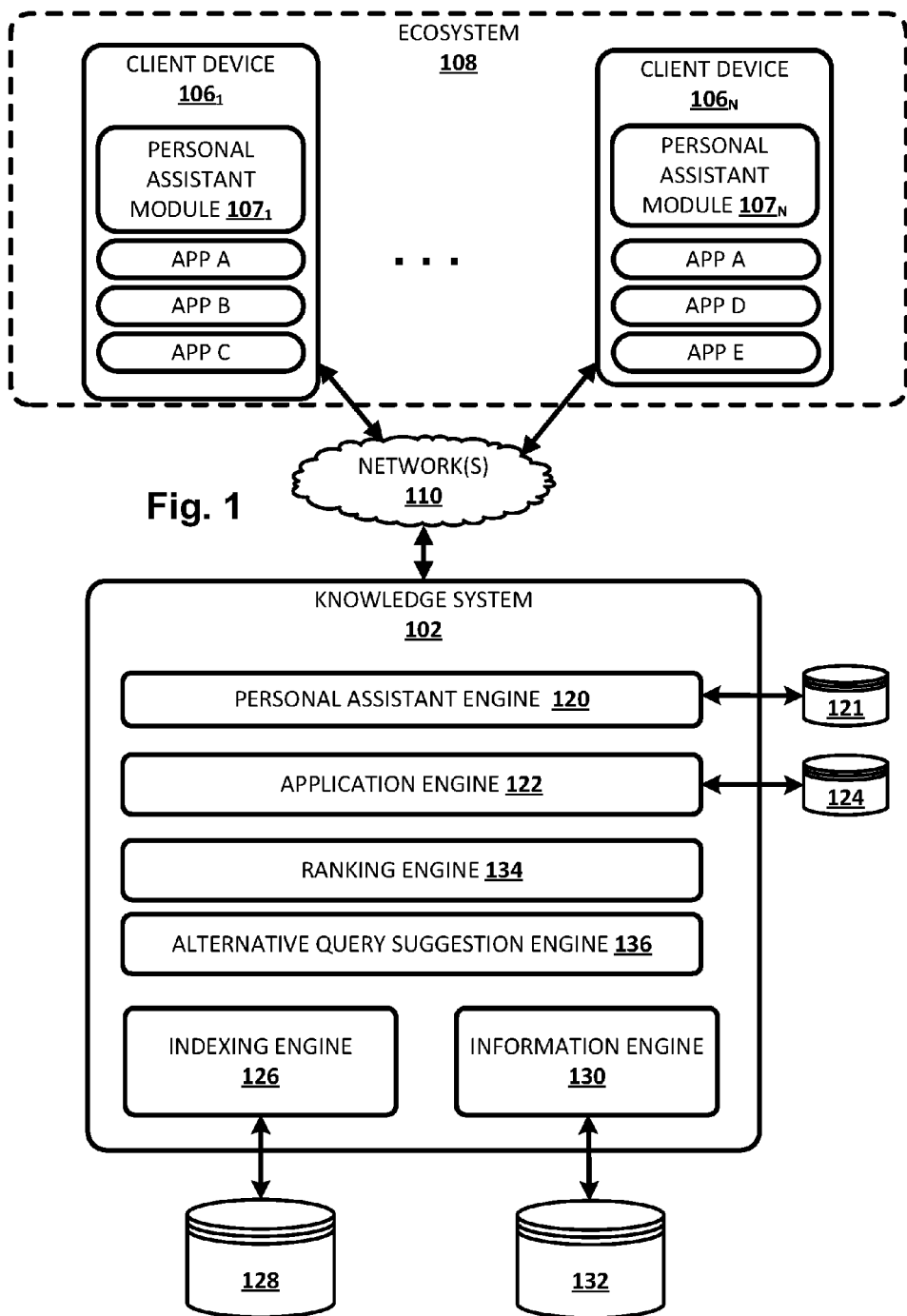
FIG. 1 illustrates an environment in which one or more selectable application links may be incorporated into a message exchange thread, in accordance with various implementations.

FIG. 1 illustrates an environment in which one or more "selectable application links" may be incorporated directly into a transcript of a message exchange thread between a user and one or more instances of a personal assistant module that is rendered on a client device operated by the user. The example environment includes a plurality of client devices $106_{1-N}$ and a knowledge system 102. Knowledge system 102 may be implemented in one or more computers that communicate, for example, through a network. Knowledge system 102 is an example of an information retrieval system in which the systems, components, and techniques described herein may be implemented and/or with which systems, components, and techniques described herein may interface.

A user may interact with knowledge system 102 via one or more client devices 106 that collectively form a coordinated "ecosystem" 108 of client devices. Each client device 106 of the user's ecosystem 108 may be a computer coupled to the knowledge system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided.

Each client device 106 may operate a variety of different applications, such as a personal assistant module 107, and/or the applications APP A, APP B, APP C, APP D, and APP E depicted in FIG. 1. It can be seen that different hypothetical applications are installed on different client devices 106. For example, first client device 106₁ has APP A, APP B, and APP C installed. Another client device 106_N also has APP A installed, but does not have APP B or APP C installed. However, the other client device 106_N has APP D and APP E installed. APPs A-E are meant to generically refer to any application that can have an interface exposed to a user of the client device 106 in response to various events. An application interface may be "exposed" to a user (i.e. allow the user to interact with it) by loading/opening/launching the application (e.g., from non-volatile memory), or, if the application is already initiated/opened/launched in the background, bringing the application to the foreground (e.g., making the application window the active window). These apps (and any "candidate application" mentioned herein) can include but are not limited to applications for making reservations or obtaining tickets (e.g., restaurant reservations, hotel reservations, airline reservations, train reservations, event reservations, etc.), map applications, calendar applications, reminder applications, media consumption applications (e.g., music or video players), games, messaging apps, weather apps, real estate apps, health tracking apps, shopping apps, news apps, ride sharing apps, productivity applications such as word processors or spreadsheet applications, telephone applications, web browsers, and so forth.

Each client device 106 and knowledge system 102 may include one or more memories for storage of data and software applications, one or more processors for accessing data and executing applications, and other components that facilitate communication over a network. The operations performed by one or more client devices 106 and/or knowledge system 102 may be distributed across multiple computer systems. Knowledge system 102 may be implemented as, for example, computer programs running on one or more computers in one or more locations that are coupled to each other through a network.

In various implementations, knowledge system 102 may include a personal assistant engine 120, an application engine 122, an indexing engine 126, an information engine 130, a ranking engine 134, and an alternative query suggestion engine 136. In some implementations one or more of engines 120, 122, 126, 130, 134, and/or 136 may be omitted. In some implementations all or aspects of one or more of engines 120, 122, 126, 130, 134, and/or 136 may be combined. In some implementations, one or more of engines 120, 122, 126, 130, 134, and/or 136 may be implemented in a component that is separate from knowledge system 102. In some implementations, one or more of engines 120, 122, 126, 130, 134, and/or 136, or any operative portion thereof, may be implemented in a component that is executed by client device 106.

In various implementations, personal assistant engine 120 may include complementary functionality for handling voice input, e.g., using a voice-based query processor that relies on various online acoustic/language, grammar and/or action models that may be stored in index 121. It will be appreciated that in some implementations, particularly as most client devices 106 are resource-constrained devices, personal assistant engine 120 may implement more complex and computational resource-intensive voice processing functionality than is local to each client device 106. It should be further understood that when an action is described herein as being performed by personal assistant module 107, that may or may not also include one or more aspects of the action being performed by personal assistant engine 120.

In some implementations, multiple personal assistant engines 122 may be employed, each acting as an online counterpart for one or more individual personal assistant modules 107. For example, in some implementations, each client device 106 in ecosystem 108 may be configured to operate an instance of a personal assistant module 107 that is associated with the user (e.g., configured with the user's preferences, associated with the same interaction history, etc.). A single, user-centric online instance of personal assistant engine 120 may be accessible to each of these multiple instances of personal assistant module 107, depending on which device the user is operating at the time.

In some implementations, both online and offline functionality may be supported, e.g., such that online functionality is used whenever a client device 106 is in communication with an online service, while offline functionality is used when no connectivity exists. In other implementations different actions or action domains may be allocated to online and offline functionality, and while in still other implementations, online functionality may be used only when offline functionality fails to adequately handle a particular voice input. In other implementations, however, no complementary online functionality may be used.

In various implementations, personal assistant module 107 and/or personal assistant engine 120 may store, for later use, a transcript of messages and/or other data exchanged between the user and personal assistant module 107, e.g., as a persistent message exchange thread. For example, personal assistant module 107 and/or personal assistant engine 120 may store messages themselves, e.g., in index 121. In some implementations, these messages may be annotated, e.g., with a timestamp, location where the message was contributed to a message exchange thread, subject matter of the message, etc. These stored messages and annotations (or metadata as the case may be) may be used later to improve conversational flow between the user and one or more instances of his/her personal assistant module 107. As used herein, a "transcript" may refer to a live record of text, images, sounds, and/or applets exchanged and/or viewed in a message exchange thread. In some implementations, a transcript of a message exchange thread may be updated in real time or near real time as the user converses with one or more instances of personal assistant module 107.

Application engine 122 may maintain an index 124 of applications installed or otherwise available to client devices 106. For example, application engine 122 may be integral with, or at least in communication with, a so-called "app store" from which users of client devices 106 download applications (or "apps"). In some implementations, when a user downloads and/or installs an app from application engine 122 (or from an app store in communication with application engine 122), a record may be added, e.g., in index 124, that the user has that application installed. In some implementations, these records may be periodically synchronized with client devices 106 to reflect, for instance, when users uninstall apps, when users download and install apps from sources other than an app store available to application engine 122, and so forth. As will be described below, application engine 122 is one of multiple components depicted in FIG. 1 that can participate in the process of identifying applications that are installed on client devices 106, so that suitable selectable application links may be inserted into transcripts of message exchange threads rendered by client devices 106.

In some implementations, application engine 122 may be accessible by individual users through accounts the users set up. For example, a user may have an account with application engine 122 (or with an app store in communication with application engine 122) that the user can access using various credentials (e.g., username/password, retinal scan, fingerprint scan, etc.). Once the user is signed in to her account, she may download one or more apps to one or more client devices forming an ecosystem of client devices operated/owned by the user. In some instances, particular apps may only be available for download on the condition that the user purchase the app (or rights to use the app). In some implementations, when a user purchases an app, the user thereafter may have the right to download and install the app on multiple client devices 106 of ecosystem 108.

Indexing engine 126 may maintain an index 128 for use by knowledge system 102. The indexing engine 126 processes documents and updates index entries in the index 128, for example, using conventional and/or other indexing techniques. For example, the indexing engine 126 may crawl one or more resources such as the World Wide Web and index documents accessed via such crawling. As another example, the indexing engine 126 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

Information engine 130 may maintain another index 132 that includes or facilitates access to non-document-specific information for use by the knowledge system 102. For example, knowledge system 102 may be configured to return information in response to search queries that appear to seek specific information. If a user searches for "Ronald Reagan's birthday," knowledge system 102 may receive, e.g., from information engine 130, the date, "Feb. 6, 1911." This information may be returned to the user as a part of search results that is separate from documents received from indexing engine 126. In various implementations, index 132 itself may contain information, or it may link to one or more other sources of information, such as online encyclopedias, almanacs, and so forth. In various implementations, index 128 or index 132 may include mappings between queries (or query terms) and documents and/or information.

In this specification, the term "database" and "index" will be used broadly to refer to any collection of data. The data of the database and/or the index does not need to be structured in any particular way and it can be stored on storage devices in one or more geographic locations. Thus, for example, the indices 121, 124, 128, and 132 may include multiple collections of data, each of which may be organized and accessed differently.

Ranking engine 134 may use the indices 128 and/or 132 to identify documents and other information responsive to a search query, for example, using conventional and/or other information retrieval techniques. Ranking engine 134 may calculate scores for the documents and other information identified as responsive to a search query, for example, using one or more ranking signals. Each ranking signal may provide information about the document or information itself, the relationship between the document or information and the search query, and/or the relationship between the document or information and the user performing the search.

Alternative query suggestion engine 136 may use one or more signals and/or other information, such as a database of alternative query suggestions (not depicted) and/or information about a user of client device 106 (e.g., search history, GPS location, user attributes), to generate alternative query suggestions to provide to client device 106 along with any search results. As a user types consecutive characters of the search query, alternative query suggestion engine 136 may identify alternative queries that may be likely to yield results that are useful to the user. For instance, assume the client device 106 is located in Chicago, and has typed the characters, "restaur." Alternative query suggestion engine 136 may, based on a location signal indicating that the client device 106 is in Chicago and a search history signal indicating a user's preference for restaurants with live music, suggest a query, "restaurants in Chicago with live music." As another example, for a user who has typed "Ronald Reagan's birt," alternative query suggestion engine 136 may, e.g., using techniques such as prefix matching, determine and suggest alternative queries such as "Ronald Reagan's birthday," "Ronald Reagan's birthplace," "Ronald Reagan's birth control position," and so forth. Alternative query suggestion engine 136 may provide other suggestions as well, such as spelling-corrected versions of a partially-formed search query.

In various implementations, one or more instances of personal assistant module 107 and/or personal assistant engine 120 may be configured to detect one or more cues emanating from a message exchange thread between the user and the one or more instances of personal assistant module 107. In various implementations, the one or more cues may trigger incorporation of one or more selectable links into the message exchange thread. Each of the one or more selectable applications links may link to an application that is distinct from the message exchange thread and/or from personal assistant module 107.

In some implementations, the cues may emanate from content of the message exchange thread. For example, the user mentioning an entity or keyword/phrase associated with one or more applications may constitute a cue to incorporate one or more selectable application links to the one or more applications into the message exchange thread. Another example of a cue is a statement directed by the user to personal assistant module 107 that matches a pattern or template associated with an application. In various implementations, the template may be associated with a particular application. For instance, the template may have been generated from a corpus of messages that includes messages from prior message exchange threads that lead to user invocation or activation of a particular application. In some implementations, the template may be associated with a cluster of messages from a corpus that share one or more attributes, such as the messages including the same or similar fixed and "transient" text. In yet other implementations, cues may be more explicit. For example, a user could input a message into the thread that is directed at her personal assistant module, e.g., "Hey BOT, what's the weather in San Francisco?" This may prompt the personal assistant module 107 to incorporate one or more application links into the transcript of the message exchange thread, such as a link to a weather app that is already preloaded with San Francisco weather.

To determine which selectable application links are to be incorporated into transcripts of the message exchange thread that are displayed on client devices 106, one or more personal assistant modules 107, and/or personal assistant engine 120 or application engine 122, may identify one or more candidate applications that are installed on the client device 106 operated by a user in the message exchange thread. In various implementations, the one or more identified candidate applications may be associated with content of the message exchange thread. In some implementations, the one or more cues discussed above may be associated with one or more applications.

As one example, if the user mentions music and/or musicians, the one or more candidate applications may be applications associated with playing, recording, and or producing music. If the user mentions movies, television, and/or actors/directors, then the one or more candidate applications may be associated with playing movies/television, or with searchable databases of cast/crew associated with movie and television productions. If the user mentions travelling, then the one or more candidate applications may be associated with making travel reservations for hotels, airlines, trains, boats, rental cars, etc. If the user mentions restaurants, the one or more candidate applications may be associated with making restaurant reservations, restaurant reviews, calling restaurants, and so forth.

Once the one or more candidate applications are identified, one or more selectable application links (also referred to as "selectable links") may be incorporated into a transcript of the message exchange thread that is displayed in a graphical user interface of the given client computing device 106 currently operated by the user. In various implementations, each selectable link may be operable by the user to cause the client device 106 to expose to the user an interface associated with a respective candidate application. For example, if a respective candidate application is running in the background (e.g., already loaded in some form into volatile memory), then operation of the corresponding selectable link may cause the candidate application to be made active so that the user is exposed to, and hence can interact with, an interface (graphical, audible, haptic, etc.) of the respective candidate application. If a respective is installed but not running in the background, then operation of the corresponding selectable link may cause the candidate application to be opened or "launched," e.g., from nonvolatile memory.

Selectable application links that are incorporated into a message exchange thread (e.g., into a transcript of the thread displayed by at least one personal assistant module 107) may come in various forms. In some implementations, a selectable application link may come in the form of a graphical icon or animation associated with the linked-to application. In some implementations, the selectable application link may include text that conveys information about the application, or an action that can be taken using the application (e.g., "get directions to location"). In various implementations, the selectable link may be rendered as part of the transcript just like any other message of the message exchange thread, e.g., within a "bubble" that is meant to represent a statement made by the personal assistant module 107. As such, the selectable application link may "move up" as additional messages are appended to the message exchange thread.

In some implementations, knowledge system 102 may have, e.g., as part of information engine 130 and/or another component, a so-called knowledge base that contains records of known entities, entity types (e.g., "person," "place," "thing") and relationships between the known entities. In some implementations, such a knowledge base may be implemented, e.g., in index 132, as a graph in which nodes represent entities and edges represent relationships between entities and/or entity types, although this is not required. In some such implementations, information about entities from such a knowledge base may be made available to components such as personal assistant engine 120 and/or one or more instances of personal assistant module 107. Those components may then use the entity information to identify relevant applications, prepopulate one or more input fields or other data points usable to transition between different states of a state machine associated with the identified candidate applications, and so forth.

In some implementations, the knowledge base may be used, e.g., by one or more of engines 120, 122, 126, and/or 130, to identify a first entity or entity type mentioned in one or more messages exchanged between the user and one or more instances of personal assistant module 107. Information related to the entity/entity type that is obtained, for instance, in response to a search query about the entity, may then be used to identify one or more candidate applications. For example, suppose a user submits into the message exchange thread a message such as "Babe Ruth was the greatest!" "Babe Ruth" may be identified, e.g., by information engine 130 based on a knowledge base stored in index 132, along with one or more attributes of Babe Ruth, and/or one or more related entities, such as one or more teams he played for (e.g., the New York Yankees), his family members, his teammates, years active, years alive, and so forth. One or more pieces of this information may then be used to identify one or more candidate applications or applications "categories" that may be responsive or otherwise relevant to the mention of the entity. In some implementations, pieces of this information may be used to "prepopulate" one or more data points (e.g., input parameters, data entry fields, data points that cause transition between states of a state machine, etc.) associated with a linked-to application. That way, when the user actuates a selectable application link, the linked-to application may open in a state in which the one or more data points are already populated.

Figure 2:
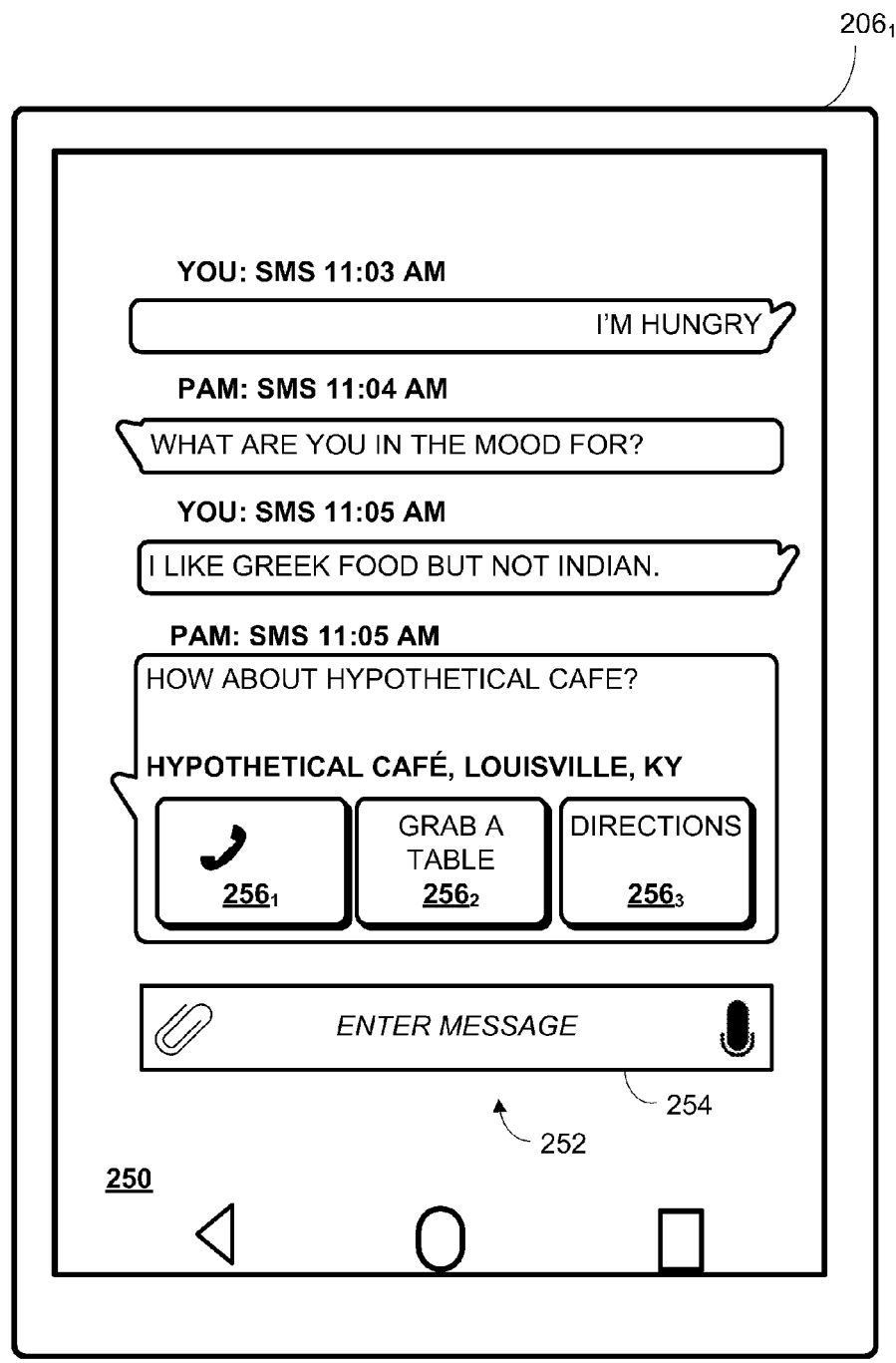
FIG. 2, FIG. 3, and FIG. 4 depict examples of how client devices may render graphical user interfaces, in accordance with various implementations.

FIG. 2 depicts a first client device $206_1$ (taking the form of a smart phone or tablet computer) operated by a user named Sven. Client device $206_1$ includes a graphical user interface 250 depicting a transcript 252 of a persistent message exchange thread between Sven and one or more instances of a personal assistant module ("PAM" in FIG. 2). Graphical user interface 250 also includes a text input field 254 that Sven can use to input text (e.g., by typing or speaking) or other content into the message exchange thread, e.g., in response to previous statements by the personal assistant module. In this example, Sven ("You" in FIG. 2 because this is Sven's client device $206_1$) has stated that he is hungry. The personal assistant module asks Sven what he is in the mood for, and Sven replies, "I like Greek food but not Indian." The personal assistant module responds by proposing a restaurant called "Hypothetical Café."

Figure 3:
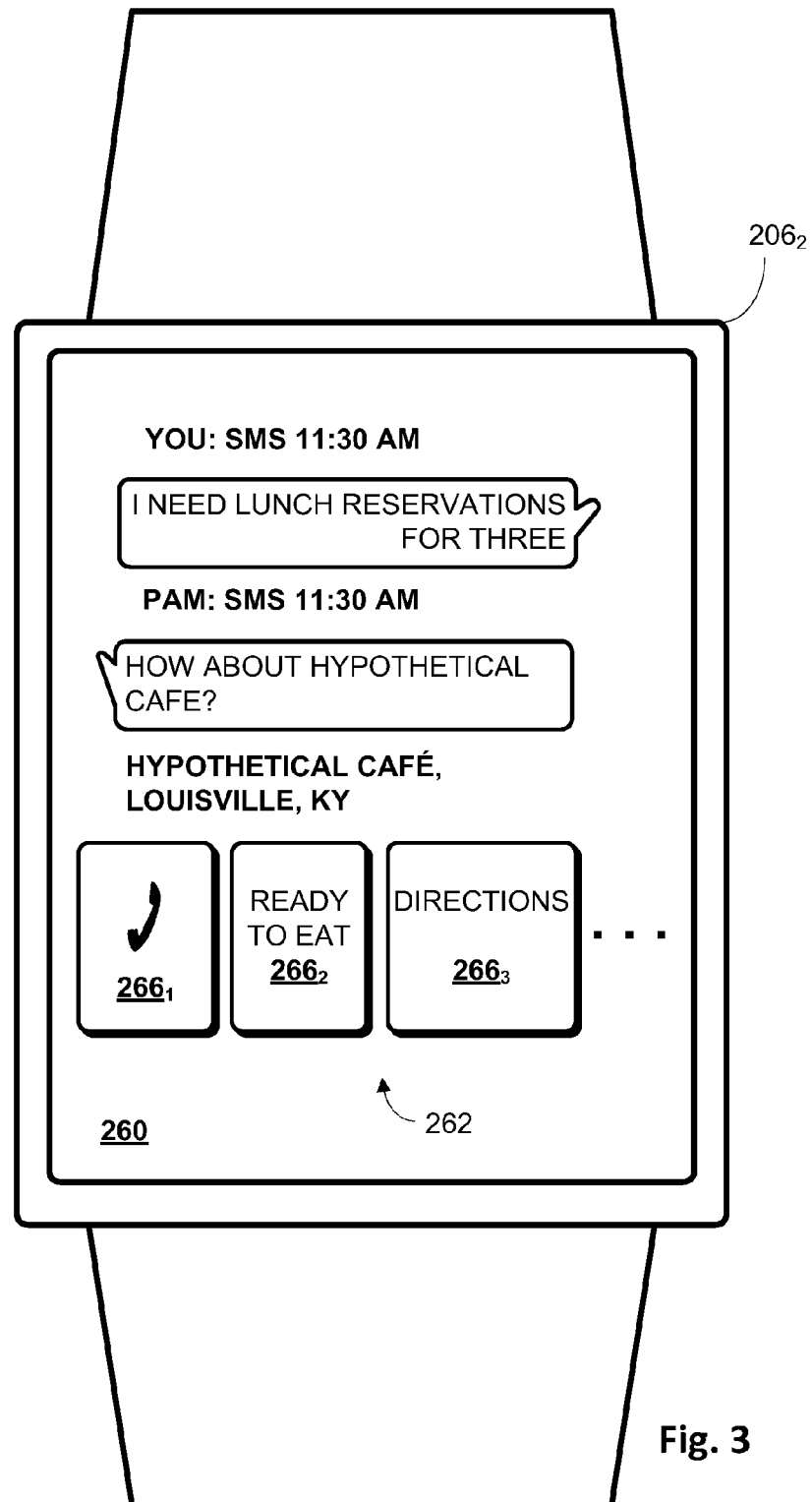

At this point in the conversation, the mention of a known entity (Hypothetical Café) may lead to a plurality of selectable application links $256_{1-3}$ to be rendered in the transcript 252. In FIG. 2, selectable application links $256_{1-3}$ are depicted within the bubble. However, this is not meant to be limiting. In other implementations, such icons may or may not include graphics and/or animation, and may be rendered outside of a bubble, e.g., as depicted in FIG. 3. Moreover, in some implementations, selectable links may be purely textual hyperlinks.

First selectable application link $256_1$ links to a telephone application. If Sven selects this link, an interface of a telephone app installed on client device 206 may be exposed to Sven. For example, the telephone app may be launched, and/or the telephone app may be provided the active window (which in many mobile devices is a single window). In some implementations, the telephone app may be pre-dialed to call a telephone number associated with Hypothetical Café. A third selectable application link $256_3$ links to a mapping application, e.g., with directions to Hypothetical Café preloaded.

Second selectable link $256_2$ links to a 'GRAB A TABLE" application that is operable by Sven to make a reservation at Hypothetical Café. If Sven selects that link, an interface (e.g., a graphical, interactive voice response, haptic, etc.) associated with the "GRAB A TABLE" application may be exposed to Sven. In some implementations, the "GRAB A TABLE" app may have various data points such as inputs prepopulated with data obtained from various sources. In some implementations, the data points may be prepopulated with contextual data obtained from client device $206_1$ and/or from various components of knowledge system 102. For example, global positioning system ("GPS") coordinates provided by client device $206_1$ operated by Sven may reveal that Hypothetical Café is nearby.

FIG. 3 depicts a second client device $206_2$ (taking the form of a smart watch) of Sven's ecosystem that is operated by Sven sometime later. Client device $206_2$ includes a graphical user interface 260 depicting a transcript 262 of the persistent message exchange thread between Sven and one or more instances of his personal assistant module ("PAM" in FIG. 3). In this example, Sven states, "I need lunch reservations for three." Without the context provided by the prior messages depicted in FIG. 2, such a request may be unresolvable by an instance of the personal assistant module operating on second client device $206_2$. However, using techniques described herein, the instance of the personal assistant module operating on second client device $206_2$ may have access to a persistent message exchange thread between Sven and multiple instances of the personal assistant module that operate on multiple devices of Sven's ecosystem (see 108 in FIG. 1). Accordingly, the personal assistant module is able to once again suggest Hypothetical Café, and once again renders a plurality of selectable application links $266_{1-3}$ in transcript 262.

Oftentimes users may have different applications installed on different devices of their ecosystems of devices, as was depicted in FIG. 1. That is the case with Sven's first and second client device $206_1$ and $206_2$. First client device $206_1$ has a reservation application called "GET A TABLE," but second client device $206_2$ has an alternative reservation application called "READY TO EAT." Consequently, when second selectable application link $256_2$ is rendered on first client device $206_1$ as depicted in FIG. 2, it links to the locally installed "GET A TABLE" application. However, when second selectable application link $266_2$ is rendered on second client device $206_2$ as depicted in FIG. 3, it links to the locally installed "READY TO EAT" application. As will be described below, in various implementations, applications that are installed on client devices may dictate which selectable links are incorporated into message exchange threads between users and personal assistant modules.

Figure 4:
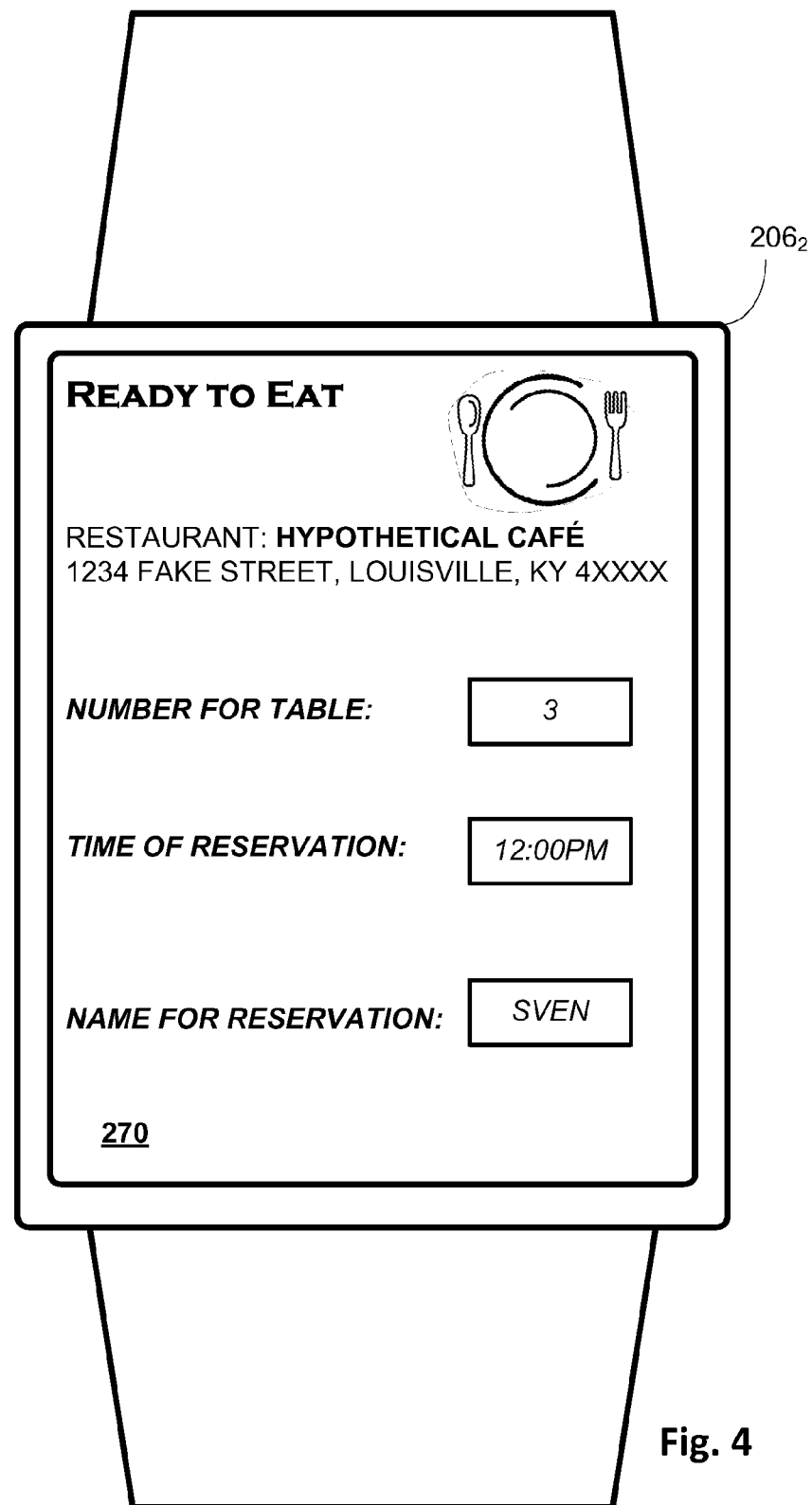

An example of an interface 270 associated with the "READY TO EAT" application (which is merely a hypothetical application described herein for demonstrative purposes) that may be exposed to Sven in response to Sven operating selectable application link $266_2$ in FIG. 3 is depicted in FIG. 4. In this example, the "READY TO EAT" interface 270 has been rendered on Sven's second client device $206_2$ with various data points (e.g., input fields) prepopulated. For example, because Sven mentioned needing a reservation for three, the reservation has been queued up for three diners.

The time of reservation has been prepopulated with 12:00 PM. This may be because, for instance, Sven would need sufficient time to reach the restaurant after discussing lunch with his personal assistant module at 11:30 AM. The time of the reservation additionally or alternatively may have been prepopulated with 12:00 PM because that is next time of day people commonly have a meal. Had Sven discussed eating at, say, 3:30 PM, then the time for the reservation may have been prepopulated with a time more commonly associated with dinner, such as 6:30 PM. The name of the reservation is "SVEN" because Sven is the user interacting with the personal assistant module.

The example of FIGS. 2-4 relates to restaurants, but it should be understood that selectable application links may link to numerous other types of applications, and depending on the type of application, may include other types of preloaded data. For example, suppose a user operating a client device asks his or her personal assistant module to hail a taxi. In various implementations, a selectable application link that links to a transportation app may be incorporated into the conversation between the user and the personal assistant module. In various implementations, the user's current location (e.g., as determined by GPS functionality of the client device) may be used to prepopulate a "current location" data point associated with the transportation app. If the user also specified an intended destination, a "destination" field associated with the transportation app may be similarly prepopulated.

Figure 5:
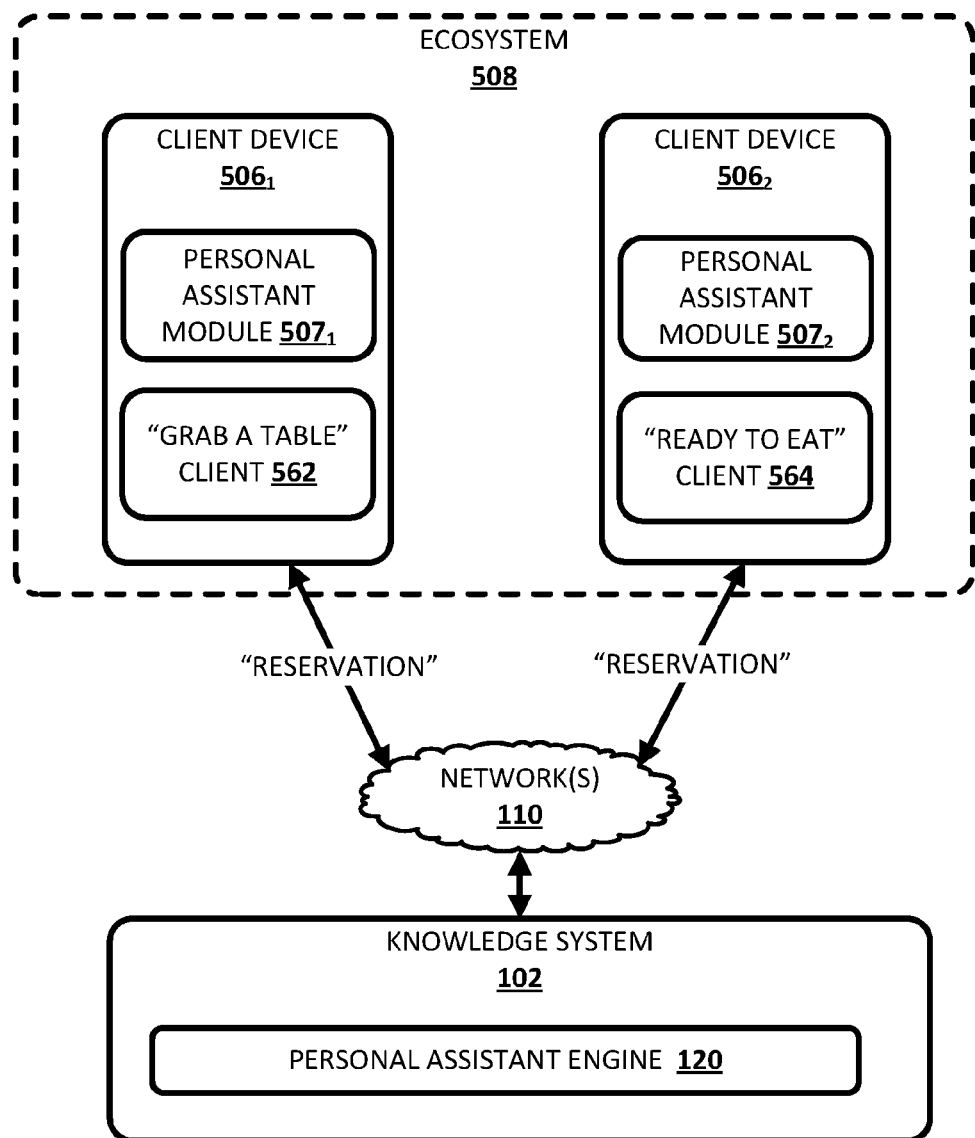
FIG. 5 depicts one example of how individual client devices may identify candidate applications that are installed locally, in accordance with various implementations.

As noted above, one or more selectable application links may be selectively rendered in a transcript displayed by a client device based at least in part on resources available on the client device. For example, in some implementations, only selectable application links to installed applications may be displayed on a client device. FIG. 5 depicts various components of the environment depicted in FIG. 1 and demonstrates how one or more components that is integral with (e.g., software installed on, a hardware component of) a client device 506 of a user's ecosystem 508 may perform the identification of applications installed on the client device 506. In this example, first client device $506_1$ has installed, among other things, the (hypothetical) reservation client application 562 called "GRAB A TABLE" that was discussed previously. Second client device $506_2$ has installed, among other things, a different (hypothetical) reservation client application 564 called "READY TO EAT."

Suppose the user interacts with first client device $506_1$ of the user's ecosystem 508 to converse with a first instance of a personal assistant module $507_1$. Suppose further that the message exchange thread includes a discussion about where to eat, similar to FIG. 2. Based on this discussion (i.e., on one or more cues from the discussion that relate to making a restaurant reservation), an application category of "RESERVATION" has been identified, e.g., by personal assistant engine 120 and/or application engine 122, and an indication of this category has been provided to first client device $506_1$.

Suppose the user later interacts with a second client device $506_2$ of the user's ecosystem 508 to converse with a second instance of a personal assistant module $507_2$. Suppose further that the message exchange thread includes a discussion about where to eat, similar to FIGS. 3-4. Based on this discussion (i.e., on one or more cues from the discussion that relate to making a restaurant reservation), an application category of "RESERVATION" has been identified, e.g., by personal assistant engine 120 and/or application engine 122, and an indication of this category has been provided to second client device $506_2$.

Upon receipt by the personal assistant modules $507_{1-2}$ of the indication of the "RESERVATION" application category, each can identify one or more locally-installed applications that match the "RESERVATION" category. For example, first client device $506_1$ has the "GRAB A TABLE" client 562 installed, which first personal assistant module $507_1$ may identify as a "RESERVATION" application. Consequently, first personal assistant module $507_1$ may incorporate, into a transcript of the message exchange thread it displays, a selectable application link to the "GRAB A TABLE" client 562. Likewise, second client device $506_2$ has the "READY TO EAT" client 564 installed, which second personal assistant module $507_2$ may identify as a "RESERVATION" application. Consequently, second personal assistant module $507_2$ may incorporate, into a transcript of the message exchange thread it displays, a selectable application link to the "READY TO EAT" client 564.

In some implementations, a client device may have multiple applications installed that match a particular application category. For example, a single client device may have both the "GRAB A TABLE" client 562 and the "READY TO EAT" client 564 depicted in FIG. 5. In some implementations, selectable application links to both applications may be incorporated into the message exchange thread transcript on that client device. In some versions, the multiple selectable application links may be presented in an order that is selected based on a variety of information signals, such as frequency of use of each client. If "GRAB A TABLE" client 562 is used more frequently than "READY TO EAT" client 564, a selectable application link to client 562 may be presented first, more prominently, more conspicuously, etc., than a selectable application link to client 564.

In some implementations in which multiple applications installed on a single client device match an application category, a personal assistant module 507 or other component may analyze how frequently those multiple applications are used to determine whether each warrants incorporation of a selectable application link into a transcript of a message exchange thread. For example, a frequency of use associated with a given application may need to satisfy a predetermined threshold, in isolation or relative to other matching installed applications, in order to have a corresponding selectable application link incorporated into message exchange thread transcripts. If the application is not used frequently, or even at all (e.g., if the application was installed by the equipment manufacturer and never opened by the user), then no selectable application link to the application may be incorporated into transcripts of message exchange threads.

Figure 6:
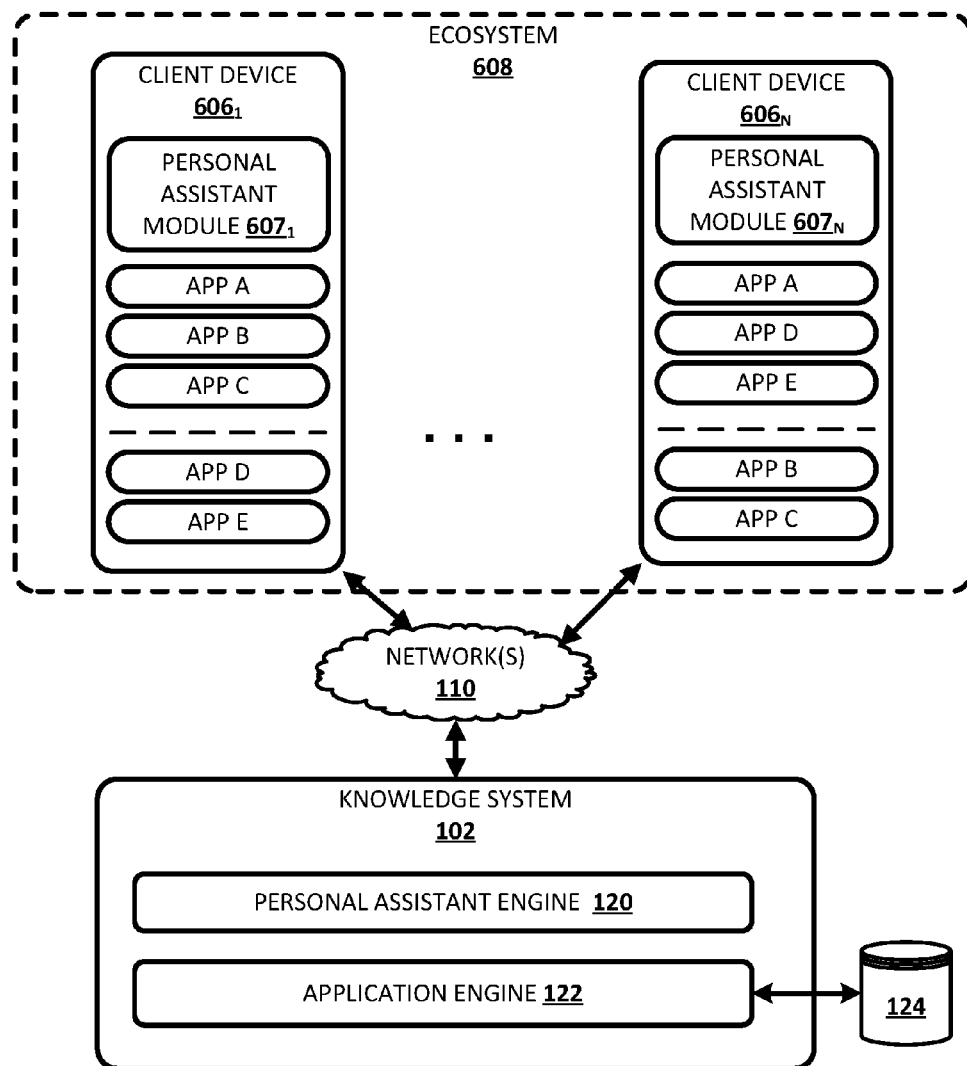
FIG. 6 depicts one example of how candidate applications that are installed on individual client devices may be identified remotely, in accordance with various implementations.

FIG. 6 depicts an alternative scenario to FIG. 5. Here, identification of installed applications on client devices $606_{1-N}$ of a coordinated ecosystem 608 operated by a user may be performed at least in part remotely from the client devices $606_{1-N}$. In particular, application engine 122 (which was described above and may be integral with, or at least in communication with, an app store) may be configured to determine, based on records in index 124, what applications are installed on which client devices 606 of ecosystem 608.

Suppose for this example that the user that operates client devices 606 of ecosystem 608 owns the rights to download and use applications APP A, APP B, APP C, APP D, and APP E. On a first client device $606_1$, which may be, for instance, the user's mobile phone, the user has installed APP A, APP B, and APP C. APP D and APP E are not installed on first client device $606_1$, as indicated by their placement below the line, but they may be available for download and/or installation because the user has previously purchased the right to do so. On a second client device $606_N$, which may be, for instance, the user's smart watch, the user has installed APP A, APP D, and APP E. APP B and APP C are not installed on second client device $606_N$, as indicated by their placement below the line, but they may be available for download and/or installation because the user has previously purchased the right to do so.

In the example of FIG. 6, personal assistant engine 120 may consult with application engine 122 in order to determine which applications are installed on which client devices 606. When one or more cues to incorporate one or more selectable application links into a message exchange thread are detected, personal assistant engine 120 may request that application engine 122 identify one or more applications installed on the given client device 606. Personal assistant engine 120 may then be configured to download, to the given client device 606, data indicative of one or more selectable application links to applications installed on the given client device that are also associated with content of the message exchange thread. In various implementations, the given client device 606 may automatically incorporate the one or more selectable application links into a message exchange thread transcript, or it may selectively incorporate into the transcript a subset of the one or more selectable application links in response to one or more signals (e.g., frequency of use of the linked-to application, whether the linked-to application is still installed, etc.). In some implementations, if a given application is not installed but available to a client device (as is the case with APP D and APP E on first client device $606_1$), then an application link that is selectable to fully install the application onto the client device 606 may be incorporated into a transcript of the message exchange thread displayed on that client device.

The above-described examples demonstrated how selectable application links may link to specific applications. However, this is not meant to be limiting. In some implementations, selectable application links may link to documents or other online content that is relevant to the discussion and that is accessible using any number of applications. For example, in some implementations, a selectable application link may link to a web address or other online identifier. In some such implementations, operation of the selectable application link at a client device may expose a favorite installed web browser to the user. In various implementations, the web browser may have already loaded a web page or other content that is relevant to the content of the message exchange thread, such as an interactive web page with functionality that corresponds to that of an application that is not installed on the client device.

Figure 7:
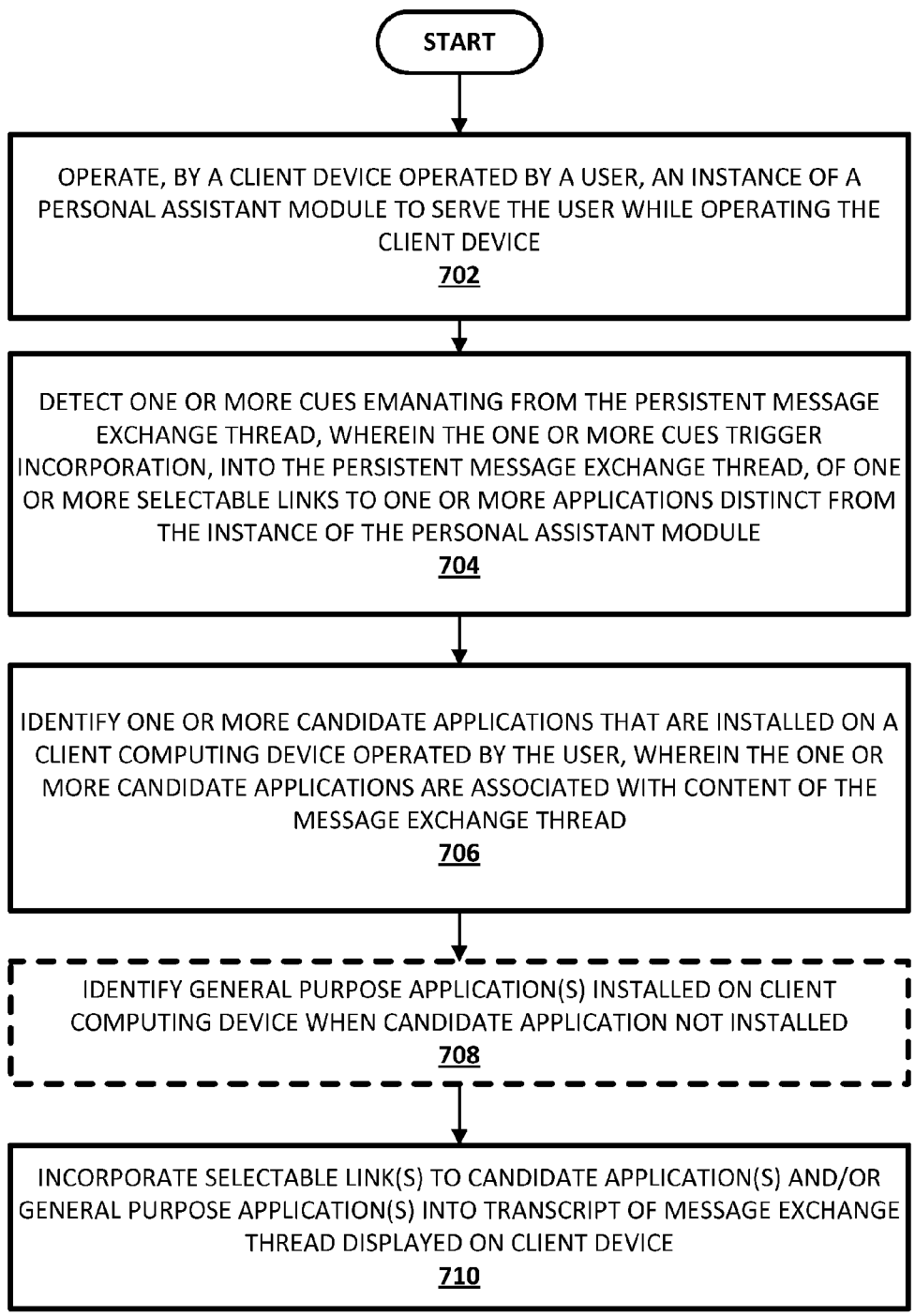
FIG. 7 depicts a flow chart illustrating an example method in accordance with various implementations.

Referring now to FIG. 7, one example method 700 of selectively incorporating one or more selectable application links directly into a transcript of a message exchange thread between a user and one or more instances of a personal assistant module is described. For convenience, the operations of the flow chart are described with reference to a system that performs the operations. This system may include various components of various computer systems, including various engines and/or client applications described herein. Moreover, while operations of method 700 are shown in a particular order, this is not meant to be limiting. One or more operations may be reordered, omitted or added.

At block 702, the system, and in particular one or more client devices of a user's ecosystem, may operate an instance of a personal assistant module to serve the user. In various implementations, the instance of the personal assistant module may have access to a persistent record of a message exchange thread between the user and one or more instances of the personal assistant module. For example, the persistent message exchange thread may be maintained by personal assistant engine 120 and made available (e.g., for synchronization) to all instances of a personal assistant module that serve the user. At block 704, the system may detect one or more cues emanating from the persistent message exchange thread. The one or more cues may trigger incorporation, into the persistent message exchange thread, of one or more selectable links to one or more applications that are distinct from the personal assistant module.

At block 706, the system may identify one or more candidate applications installed on the client device. As described above, in some implementations, the candidate applications may be those that are deemed somehow relevant to content of the message exchange thread. FIGS. 2-4 depict examples in which a user discusses dining out with a personal assistant module, and as a consequence, applications that are associated with dining out (e.g., a phone dialer to call a restaurant, a reservation application, a map application, etc.) are identified. Other examples are also described above. In some implementations, the identifying of block 706 may be performed one or more of the processors that is remote from a given client computing device, and data indicative of the one or more selectable links may be downloaded to the given client device. In other implementations, the identifying of block 706 may be performed by one or more of the processors that is integral with the given client computing device.

In some scenarios, one or more candidate applications most suitable for incorporation may not be installed on the given client computing device. However, some candidate applications (e.g., restaurant/airline reservation applications, mapping applications, etc.) may have corresponding webpages that include corresponding functionality. For instance, a user could navigate a web browser to the "GRAB A TABLE" website and make a reservation much in the same way as a user could make a reservation using the "GRAB A TABLE" app. Accordingly, in some implementations, at optional block 708, the system may identify, as a candidate application, a web browser or other general-purpose application (e.g., a phone dialer, email application, social networking application, etc.) installed on the given client computing device in response to a determination that a given application associated with content of the message exchange thread is not installed on the given client computing device.

At block 710, the system may incorporate one or more selectable application links into a transcript of the message exchange thread that is rendered by the client device. In instances in which a general purpose application such as a web browser is identified at block 708, in various implementations, the system may incorporate a selectable link to an interactive webpage that includes functionality that corresponds to functionality of the given application that was determined not to be installed on the given client computing device. Additionally or alternatively, in various implementations, the system may incorporate a selectable link to download and/or install the application that was determined not to be installed on the given client computing device.

Figure 8:
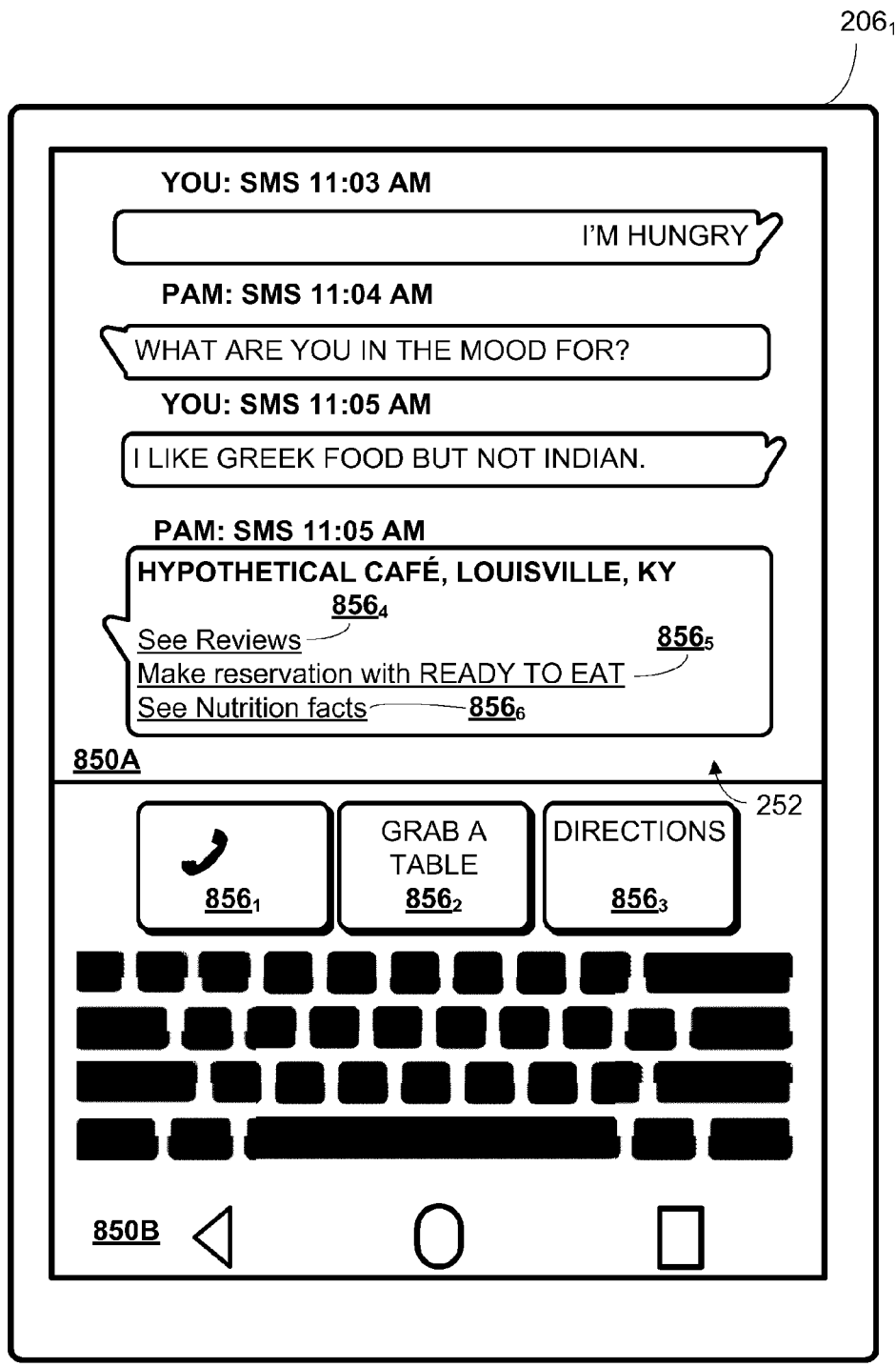
FIG. 8 depicts another example of how a client device may render a graphical user interface, in accordance with various implementations.

FIG. 8 depicts an alternative implementation to that depicted in FIG. 2. The same first client device $206_1$ (taking the form of a smart phone or tablet computer) is operated by a user named Sven. In this implementation, client device $206_1$ includes a graphical user interface with two portions: a persistent portion 850A that depicts a transcript 252 of a persistent message exchange thread between Sven and one or more instances of a personal assistant module ("PAM" in FIG. 2); and an operable portion 850B includes a keyboard and/or other graphical elements operable by Sven to input text (e.g., by typing or speaking) or other content into the message exchange thread. In some implementations, operable portion 850B may be rendered in response to Sven selecting (e.g., tapping) text input field 254 in FIG. 2. In this example, Sven ("You" in FIG. 8 because this is Sven's client device $206_1$) has stated that he is hungry. The personal assistant module ("PAM") asks Sven what he is in the mood for, and Sven replies, "I like Greek food but not Indian." The personal assistant module once again responds by proposing a restaurant called "Hypothetical Café."

However, this time the personal assistant module makes the proposal in a slightly different manner than in FIG. 2. In particular, the personal assistant module provides three selectable links $856_{1-3}$ in operable portion 850B and three more selectable links $856_{4-6}$ in persistent portion 850A. The selectable links $856_{1-3}$ contained in operable portion 850B may be more easily accessible to Sven's fingers because they are closer to the keyboard Sven operates. However, they have not be incorporated into the message exchange thread, and therefore do not appear in the transcript 252. Thus, they may be non-persistent—if Sven doesn't select them and the subject matter of the message exchange between Sven and the personal assistant module changes, selectable links $856_{1-3}$ may not persist (e.g., they may disappear and/or be replaced with selectable links that are more relevant to the current conversation).

By contrast, selectable links $856_{4-6}$ are now part of transcript 252. Accordingly, Sven may come back some time later, e.g., after transcript 252 has grown sufficiently such that selectable links $856_{1-3}$ are "moved up" from being visible in persistent portion 850A, and operate those links. More generally, selectable links incorporated into a message exchange thread in various implementations described herein (including those of FIGS. 2-4) may persist in the thread, so that a user can later "scroll up" in the thread and actuate these links long after they were incorporated. This may be true across devices of an ecosystem associated with a user. For example, Sven may later use client device $206_2$ (smart watch) depicted in FIGS. 3-4 to revisit a transcript portion originally created using client device $206_1$ and select a selectable link that was incorporated into the message exchange thread in the past.

Referring back to FIG. 8, in various implementations, selectable links may be selectively incorporated into operable portion 850B or persistent portion 850A based on various signals. In some implementations, a history of interaction between the user and a candidate application linked-to by a selectable link may be considered. For example, if six potentially responsive candidate application are identified (as is the case in FIG. 8), only links to the n most frequently-used applications may be incorporated into one portion or the other, e.g., based on user preferences, screen size, etc.

For example, in FIG. 8, the calling app (linked-to by selectable link $856_1$), the GRAB A TABLE app (linked-to by selectable link $856_2$), and the directions app (linked to by selectable link $856_3$) may be the three most frequently used applications of the six identified potentially responsive applications, and therefore may be incorporated into operable portion 850B so that they are more easily accessible to the user's fingers. The applications associated with the other selectable links $856_{4-6}$, on the other hand, may be less frequently used, and therefore may be relegated to persistent portion 850A. Of course, selectable links $856_{1-6}$ may be incorporated in other manners as well. For example, a user may prefer to have selectable links to the most frequently used apps appear in persistent portion 850A in addition to or instead of operable portion 850B, e.g., so that she can scroll up and access them at a later time.

Additionally or alternatively, other signals may be considered when selectively incorporating selectable links into operable portion 850B versus persistent portion 850A. In some implementations, a measure of relevancy of a particular candidate application to the current discussion may be considered. For example, selectable links to the most relevant applications may be incorporated into operable portion 850B, while selectable links to less relevant applications may be incorporated into persistent portion 850A, or vice versa. In some implementations, selectable links to already installed application may be incorporated into operable portion 850B, whereas selectable links to not-installed application and/or to web pages with functionality that corresponds to an uninstalled app may be incorporated into persistent portion 850A, or vice versa. In some implementations, selectable links incorporated into persistent portion 850A (or into operable portion 850B as the case may be) may include links to documents that may or may not be local to a client device, such as receipts from a prior visit to the restaurant, links to emails or other correspondence about the restaurant, and so forth.

Figure 9:
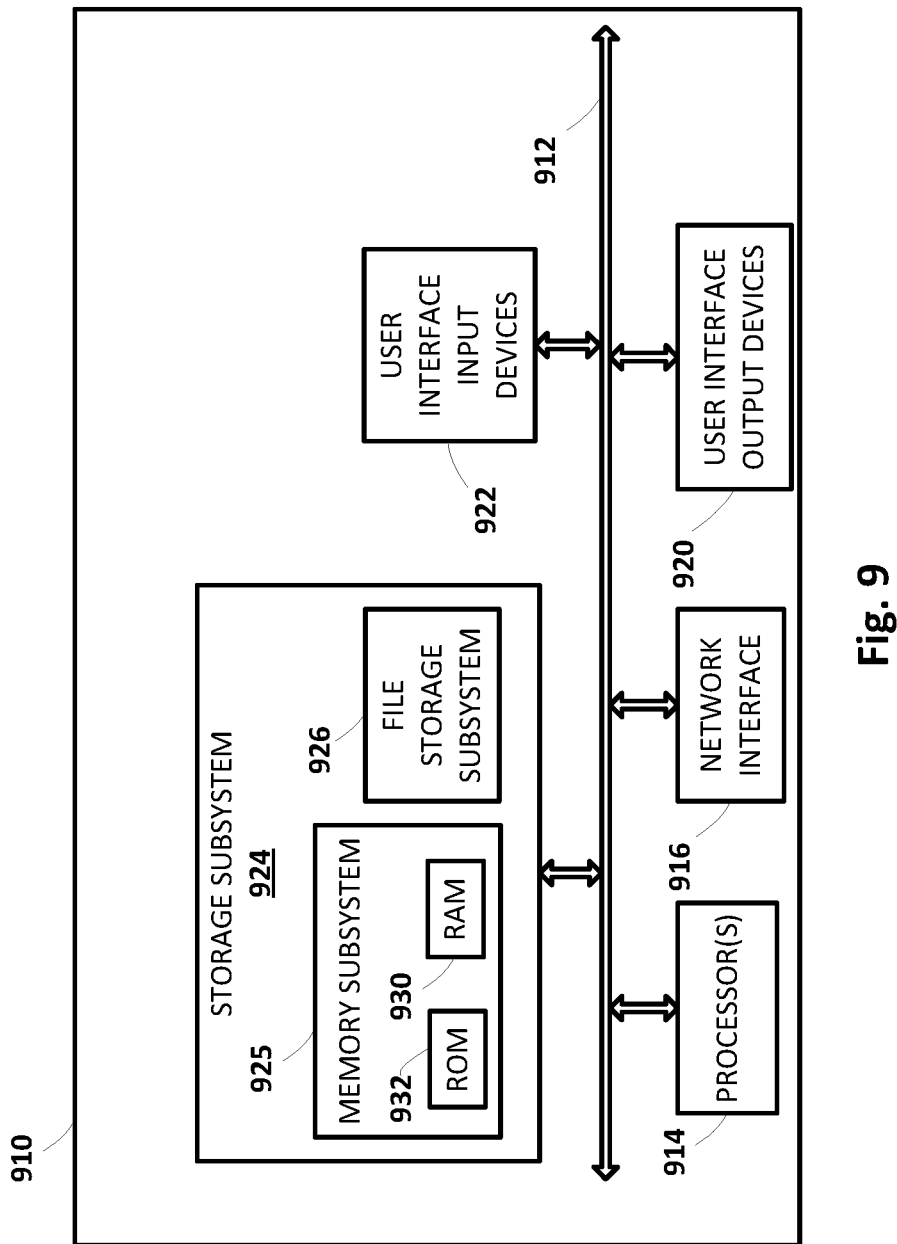
FIG. 9 schematically depicts an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 926, including, for example, a memory subsystem 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 926 stores programming and data constructs that provide the functionality of some or all of the modules described herein. For example, the storage subsystem 926 may include the logic to perform selected aspects of method 700, and/or to implement one or more of personal assistant module 107, personal assistant engine 120, application engine 122, indexing engine 126, information engine 130, ranking engine 134, and/or alternative query suggestion engine 136.

These software modules are generally executed by processor 914 alone or in combination with other processors.

Memory 925 used in the storage subsystem 926 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 926, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   operating, by a client computing device operated by a user, an instance of a personal assistant module to serve the user while operating the client computing device, wherein the instance of the personal assistant module has access to a persistent transcript of a message exchange thread between the user and one or more instances of the personal assistant module;
   rendering, by the instance of the personal assistant module, a graphical user interface that includes a persistent portion and an operable portion, wherein the persistent portion displays at least part of the persistent transcript of the message exchange thread, and the operable portion includes one or more graphical elements that are operable to incorporate content into the message exchange thread;
   detecting, by the instance of the personal assistant module, one or more cues emanating from the message exchange thread, wherein the one or more cues trigger incorporation, into the message exchange thread, of one or more selectable links to one or more applications distinct from the instance of the personal assistant module;
   and
   selectively incorporating, by the instance of the personal assistant module based on one or more signals, into the operable portion of the graphical user interface, the one or more selectable links, wherein each selectable link is operable by the user to cause the client computing device to expose to the user an interface associated with a respective application of the one or more applications.

2. The computer-implemented method of claim 1, wherein the client computing device is one of a plurality of client computing devices operated by the user, and wherein each of the plurality of client computing devices is configured to operate a separate instance of the personal assistant module with access to the message exchange thread.

3. The computer-implemented method of claim 2, wherein the one or more cues comprise multiple messages incorporated into the message exchange thread by different client computing devices of the plurality of client computing devices.

4. The computer-implemented method of claim 1, wherein the one or more cues emanate from the content of the message exchange thread.

5. The computer-implemented method of claim 4, wherein the one or more cues include a keyword or phrase associated with a particular application.

6. The computer-implemented method of claim 1, further comprising identifying, by the instance of the personal assistant module, one or more candidate applications that are installed on the client computing device operated by the user, wherein the one or more candidate applications are associated with content of the message exchange thread, and wherein each selectable link is operable by the user to cause the client computing device to expose to the user an interface associated with a respective candidate application of the one or more candidate applications.

7. The computer-implemented method of claim 1, wherein the one or more signals comprises a history of interaction between the user and the particular application.

8. A system comprising one or more processors and memory storing instructions that, when executed by the one or more processors, cause the one or more processors to:
   operate an instance of a personal assistant module to serve a user while the user operates a client computing device, wherein the instance of the personal assistant module has access to a persistent transcript of a message exchange thread between the user and one or more instances of the personal assistant module;
   render, by the instance of the personal assistant module, a graphical user interface that includes a persistent portion and an operable portion, wherein the persistent portion displays at least part of the persistent transcript of the message exchange thread, and the operable portion includes one or more graphical elements that are operable to incorporate content into the message exchange thread;
   detect one or more cues emanating from the persistent message exchange thread, wherein the one or more cues trigger incorporation, into the message exchange thread, of one or more selectable links to one or more applications distinct from the instance of the personal assistant module; and
   selectively incorporate, into the operable portion of the graphical user interface, the one or more selectable links, wherein each selectable link is operable by the user to cause the client computing device to expose to the user an interface associated with a respective application of the one or more applications.

9. The system of claim 8, wherein the client computing device is one of a plurality of client computing devices operated by the user, and wherein each of the plurality of client computing devices is configured to operate a separate instance of the personal assistant module with access to the message exchange thread.

10. The system of claim 9, wherein the one or more cues comprise multiple messages incorporated into the message exchange thread by different client computing devices of the plurality of client computing devices.

11. The system of claim 8, further comprising instructions to identify one or more candidate applications that are installed on the client computing device operated by the user, wherein the one or more candidate applications are associated with content of the message exchange thread, and wherein each selectable link is operable by the user to cause the client computing device to expose to the user an interface associated with a respective candidate application of the one or more candidate applications;
   wherein the identification is performed one or more of the processors that is remote from the given client computing device, and data indicative of the one or more selectable links is downloaded to the given client computing device.

12. The system of claim 11, further comprising instructions to select a subset of the downloaded one or more selectable links for display based on one or more information signals.

13. The system of claim 12, wherein the one or more information signals comprise a frequency of use of the one or more candidate applications.

14. The system of claim 8, wherein the one or more cues emanate from the content of the message exchange thread.

15. The system of claim 11, wherein the identification comprises identification, as a candidate application, of a web browser installed on the given client computing device in response to a determination that a given application associated with content of the message exchange thread is not installed on the given client computing device; and wherein the selective incorporation comprises selective incorporation, into the operable portion or the persistent portion, of a selectable link to an interactive webpage, wherein the interactive webpage includes functionality that corresponds to functionality of the given application that is not installed on the given client computing device.

16. At least one non-transitory computer-readable medium comprising instructions that, in response to execution of the instructions by a client computing device operated by a user, cause the client computing device to perform the following operations:

operating an instance of a personal assistant module to serve the user while the user operates the client computing device, wherein the instance of the personal assistant module has access to a persistent record of a message exchange thread between the user and one or more instances of the personal assistant module;

rendering, by the instance of the personal assistant module, a graphical user interface that includes a persistent portion and an operable portion, wherein the persistent portion displays at least part of the persistent transcript of the message exchange thread, and the operable portion includes one or more graphical elements that are operable to incorporate content into the message exchange thread;

detecting, by the instance of the personal assistant module, one or more cues emanating from the message exchange thread, wherein the one or more cues trigger incorporation, into the message exchange thread, of one or more selectable links to one or more applications distinct from the instance of the personal assistant module; and selectively incorporating, by the instance of the personal assistant module based on one or more signals, into the operable portion of the graphical user interface, the one or more selectable links, wherein each selectable link is operable by the user to cause the client computing device to expose to the user an interface associated with a respective application of the one or more applications.

17. The computer-implemented method of claim 6, wherein the identifying is performed by one or more of the processors that is remote from the client computing device, and data indicative of the one or more selectable links is downloaded to the client computing device.

18. The computer-implemented method of claim 17, further comprising selecting, by the instance of the personal assistant module, a subset of the downloaded one or more selectable links for display based on one or more information signals.

19. The computer-implemented method of claim 18, wherein the one or more information signals comprise a frequency of use of the one or more candidate applications.

20. The computer-implemented method of claim 6, wherein the identifying is performed by one or more of the processors that is integral with the client computing device.

21. The computer-implemented method of claim 6, wherein the identifying comprises identifying, as a candidate application, a web browser installed on the client computing device in response to a determination that a given application associated with content of the message exchange thread is not installed on the client computing device; and wherein the selectively incorporating comprises selectively incorporating, into the operable portion or the persistent portion, a selectable link to an interactive webpage, wherein the interactive webpage includes functionality that corresponds to functionality of the given application that is not installed on the client computing device.

22. The computer-implemented method of claim 6, wherein the identifying comprises identifying, as a candidate application, a web browser installed on the client computing device in response to a determination that a given application associated with content of the message exchange thread is not installed on the client computing device; and wherein the selectively incorporating comprises selectively incorporating, into the operable portion or the persistent portion, a selectable link to a webpage associated with downloading an installer of the given application.

* * * * *